INVENTORS
William B. Culpepper
Jack C. McGaw

BY
ATTORNEYS

June 9, 1959  W. B. CULPEPPER ET AL  2,889,627
MEANS FOR CONVERTING POLAR COORDINATES INTO SHAFT POSITIONS
Filed July 2, 1956                                    2 Sheets-Sheet 2

INVENTORS
William B. Culpepper
Jack C. McGaw

BY
Rolla N. Carter
ATTORNEYS

2,889,627

MEANS FOR CONVERTING POLAR COORDINATES INTO SHAFT POSITIONS

William B. Culpepper, Vernon, and Jack C. McGaw, Panama City, Fla., assignors to the United States of America as represented by the Secretary of the Navy Application July 2, 1956, Serial No. 595,565

2 Claims. (Cl. 33—1)

(Granted under Title 35, U.S. Code (1952), sec. 266)

The invention described herein may be manufactured and used by or for the Government of the United States of America for governmental purposes without the payment of any royalties thereon or therefor.

The present invention relates in general to translating polar coordinates into electric signals and more particularly to a mechanical system for converting angular and linear displacements of a point into shaft positions representative of the polar coordinates of the point.

In object locating systems of the echo-ranging type it is common to indicate an object or target by plan position indication (P.P.I.). In such systems a cathode ray tube is utilized in which an electron beam is swept across the face of the tube radially from the center to the periphery, and this sweep is rotated about the central point as the directional transducer of the system rotates in azimuth. Echoes from objects are utilized to intensify the sweep trace at points corresponding to their positions, and thus indicate the range and bearing of each target object.

Instead of an observer of a P.P.I. display calling out the range and bearing of possible targets for someone to plot it is frequently desirable to transmit this information to a distant station for plotting or recording for rapid analysis in conjunction with other information which may be known only to such remote station. It is generally accepted as a fact that an observer or operator can point to what he considers to be a target with much greater accuracy than he can read off the coordinates of the target from the calibrations on the display tube.

The primary object of the invention is to provide a device for converting circular and radial movements of a pointer with respect to a predetermined center point into corresponding rotational movements of two shafts, the movement of one shaft representing angle and the movement of the other shaft representing distance from said center point.

Another object of the invention is to provide means whereby the movement of a pointer over a P.P.I. presentation is converted to electric signals suitable for transmission to a distant station.

The invention itself as well as other objects thereof will be understood from the following description when read in connection with the accompanying drawing in which.

The preferred embodiment of the invention chosen for the purpose of the present disclosure employs a four-link pantograph having a fixed pivot at the joint of two of the links and having the distal ends of the other two links free, the arrangement being such that the tracing points in said distal ends lying on opposite sides of and forming a straight line with the fixed pivot move in assembly (when one of said points is moved) to maintain constant the ratio between their distances from and their alinement with the fixed pivot. In accordance with the invention a manually manipulated pointer is mounted at one of said tracing points for movement over a P.P.I. scope while the other of said tracing points is pivotally mounted in a track member which is free to move longitudinally and to rotate in its plane about an axis fixed in space, the arrangement being such that movement of the pointer along an arc centered in the center of the P.P.I. display rotates the track member about said fixed axis whereas radial movement of the pointer over the P.P.I. display moves the track member along its longitudinal axis.

Figure 2:
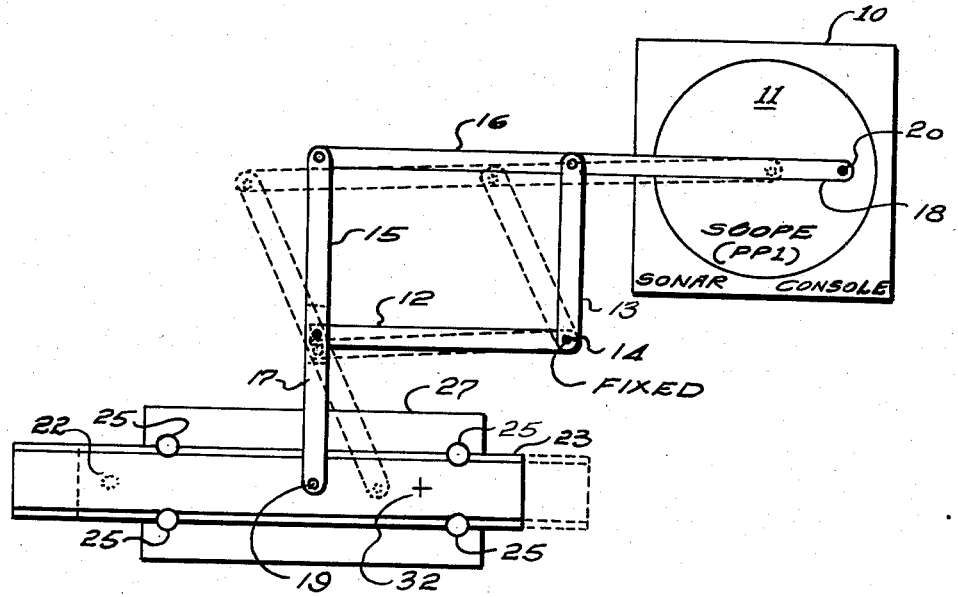
Fig. 2 is a diagrammatic sectional plan view along the line 2—2 of Fig. 1.
Figure 3:
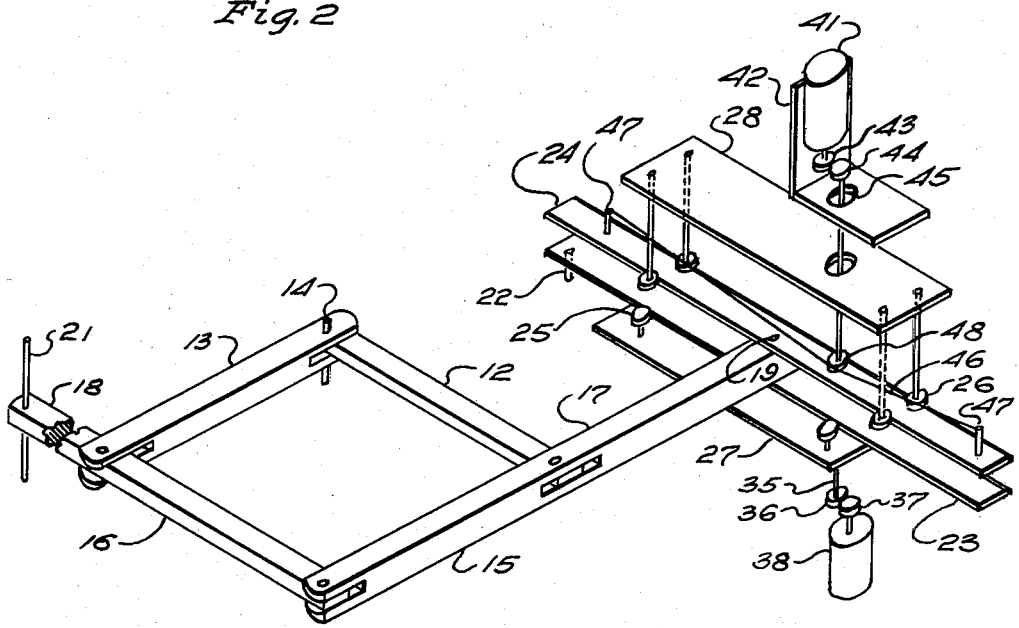
Fig. 3 is a perspective view of the moving parts of a pantograph actuated mechanism incorporating the invention.

Referring now to the drawing in which like reference characters designate like parts throughout, the preferred embodiment of the invention is shown as comprising an arrangement for taking off from the display scope of a sonar console 10 the position of possible targets which appear in P.P.I. presentation on the face of a cathode ray tube 11 provided in the console 10. This mechanism, as best seen in Figs. 2 and 3, includes a four-bar linkage connected as a pantograph with two of the bars 12 and 13 joined at a fixed pivot 14 and two other bars 15 and 16 having portions 17 and 18, respectively, extended to tracing points 19 and 20 on opposite sides of and forming a straight line with the fixed pivot 14. The tracing point 20 is arranged for manual movement over the face of the P.P.I. display 11, and at the slave tracing point 19 the extended portion 17 of the bar 15 is pivotally connected to track members 23 and 24 which are mounted for longitudinal movement in sets of rollers 25 and 26, respectively. The set of track supporting rollers 25 is suitably mounted on a lower plate member 27 and the upper set of rollers 26 is mounted in an upper plate member 28.

These two plate members 27 and 28 are rotatively mounted in a stationary housing 31 with their axes of rotation alined and so positioned that their common axis intersects the position which would be occupied by the slave tracing point 19 if the other tracing point 20 were moved to the center of the display scope 11, this point being indicated in Fig. 2 by a cross mark 32. The plate member 28 is shown as being supported for rotation by suitable bearings 33 and a bearing plate 30, and the plate 27 is similarly supported by bearings 34. The lower plate 27 is provided at its axis of rotation with a shaft 35 fixedly secured thereto and provided with a gear 36 which is meshed with a similar gear 37 carried on the shaft of a synchro-generator 38 which is mounted on a bracket 39 secured to the lower wall of the housing 31. The upper plate member 28 has a synchro-generator 41 mounted on a standard 42 carried by the bearing plate 30 so that upon rotation of the plate member 28 the synchro-generator 41 revolves around the axis of rotation. This synchro-generator 41 has a shaft gear 43 meshed with a gear 44 carried by a shaft 45 centered on the axis of rotation of the plate member 28 and supported for independent rotation by suitable means not shown. This shaft 45 is coupled to be rotated by the longitudinal movement of the track member 24 in any suitable manner here shown as comprising a string 46 supported by posts 47 anchored in the track member 24 and wrapped around a sheave or pulley 48 keyed to the lower end of the shaft 45. From a strictly functional viewpoint the track member 23 is unnecessary since rotational movement of the plate member 27 could be obtained by fastening this plate member 27 directly to the plate member 28; however, for structural reasons it is preferred to employ the track 23 as shown.

By referring to Fig. 2 it will be apparent that movement of the tracing point 20 radially over the face of the display scope 11 will impart pure longitudinal movement to the track members 23 and 24 and that movement of the tracing point 20 along an arc concentric with the center of the display scope 11 will impart pure rotational movement of the track members 23 and 24 about the axis 32, and that any other movement of the tracing point 20 over the face of the display scope 11 will impart both longitudinal and rotational movement to the track members 23 and 24, so that at all times the longitudinal position and the angular orientation of the track members 23 and 24 correspond strictly to the range and bearing of the position of the tracing point 20 on the face of the display scope 11.

Figure 1:
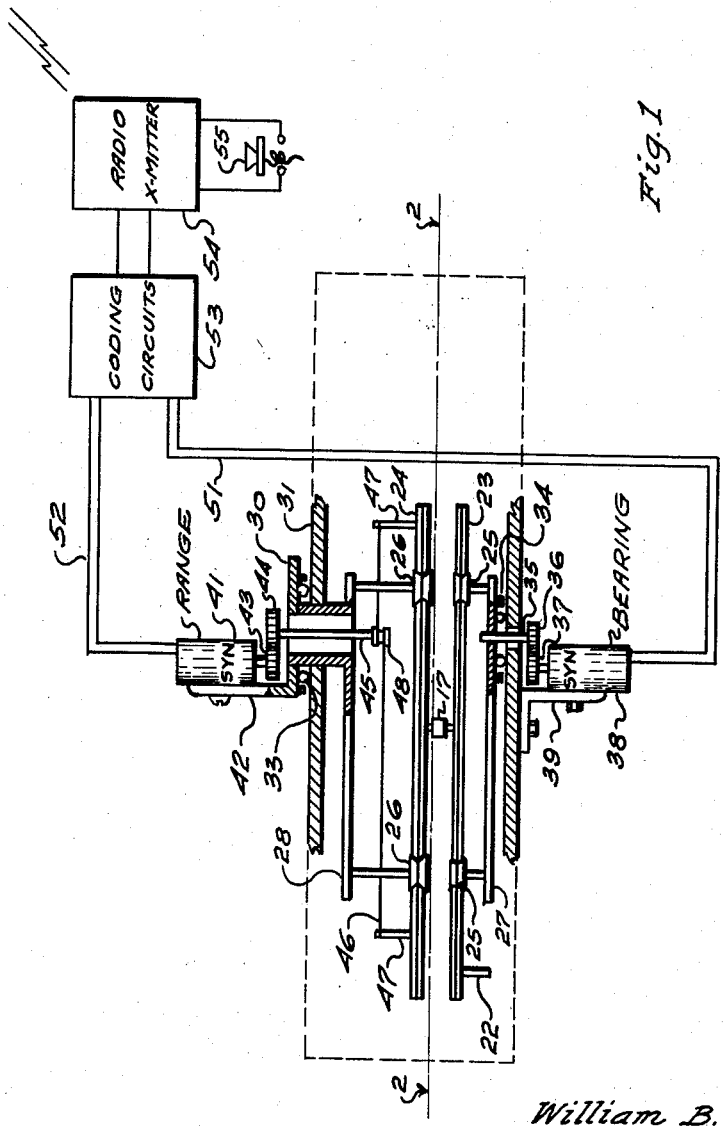
Fig. 1 is a diagrammatic showing partly in section of an apparatus embodying the invention.

By reference to Figs. 1 and 3 it will be evident that longitudinal movement of the track member 24 will rotate the sheave 48 and through its shaft 45 and gears 44 and 43 will correspondingly adjust the angular position of the rotor of the synchro-generator 41. It will also be evident that by having the synchro-generator 41 mounted to revolve with the rotation of the track member 24 that the angular position of its rotor is unchanged by such rotation. Contrariwise, longitudinal movement of the track members 23 and 24 does not affect the plate member 27 and therefore the synchro-generator 38 is unaffected by such longitudinal movement. Rotation of the track members 23 and 24 does, however, rotate the rotor of the synchro-generator 38 through the gear 37 since it is meshed with the gear 36 which rotates in assembly with the member 27. The outputs of the synchro-generators 38 and 41 are fed through leads 51 and 52, respectively, to a suitable coding device 53 which converts them to the desired form for transmittal to a remote station. As shown in Fig. 1, the coded signals are fed to a radio transmitter 54 which is adapted to be on the air only when a push button switch 55 is pressed to complete a circuit.

In operating the apparatus above disclosed an observer watching the P.P.I. display on the sonarscope 11 will grasp a pointer 21 positioned at the tracing point 20 in the extended linkage 18 and when what appears to him to be a target appears on the scope 11, he will move the pointer 21 to this target and press the switch 55 momentarily, which action will transmit the range and bearing information of the position occupied by the pointer 21. With this arrangement the observer is able to concentrate his full attention on the discovery of target representations in the P.P.I. display, which he cannot do when in addition to observing targets he must attempt to read the range and bearing scales ordinarily provided on the face of the display scope 11.

If the structure of the apparatus permitted and the pointer 21 were moved to the center of the display scope 11, the pivot at the tracing point 19 would be positioned in the axis of rotation 32 of the track members 23 and 24 which is a dead point from which the pointer 21 could be moved in only one direction. In order to eliminate such dead point the pivot at the tracing point 19 is prevented from moving to the axis 32 in any suitable manner such as by providing the track 23 with a depending pin 22 positioned to engage and be restrained by the plate member 27 as indicated by broken lines in Fig. 2.

While for the purpose of disclosing the invention a preferred embodiment thereof has been described in detail it is to be understood that many modifications will occur to those skilled in the art and it is intended to include all such modifications within the scope of the appended claims.

What is claimed is:

1. In a device for translating the position of a target displayed on a sonarscope into shaft positions representative of the polar coordinates of such target, viz., its range and bearing, a track member, a pantograph defining a plane and having two tracing points spaced on opposite sides of and defining a straight line through its fixed pivot, one of the tracing points being arranged for movement over the face of the sonarscope and the other of the tracing points being pivotally secured to the track member, a plate member supporting the track member and mounted for rotation about an axis normal to the plane of the pantograph, means on the plate member for constraining longitudinal movement of the track member to a radial direction with respect to the axis of the plate member, a first shaft arranged to be rotated in accordance with rotation of the plate member about its axis, a second shaft rotatably supported on the plate member with its axis parallel to and spaced from the axis of rotation of the plate member, and means for rotating said second shaft in strict accordance with the longitudinal movement of the track member, said last mentioned means comprising a third shaft mounted on the plate member coaxially with the axis of rotation of the plate member, means for transferring longitudinal movement of the track member into rotary movement of the third shaft, and means for transferring rotary movement of said third shaft into rotary movement of said second shaft.

2. The combination defined in claim 1 in which an additional means is provided for preventing movement of the tracing point secured to the track member to the position where it would coincide with the rotational axis of the plate member whereby the pantograph has no dead point.

References Cited in the file of this patent

UNITED STATES PATENTS

| | | |
|---|---|---|
| 2,613,266 | Ress | Oct. 7, 1952 |
| 2,649,503 | Adler | Aug. 18, 1953 |
| 2,679,033 | Hartman | May 18, 1954 |
| 2,721,109 | Ross | Oct. 18, 1955 |
| 2,808,649 | Nyyssonen | Oct. 8, 1957 |